United States Patent
Cope et al.

(10) Patent No.: US 8,396,510 B1
(45) Date of Patent: Mar. 12, 2013

(54) METHOD AND SYSTEM FOR ESTABLISHING COMMUNICATION SERVICES

(75) Inventors: Warren B. Cope, Olathe, KS (US); Douglas Alan Olding, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 1198 days.

(21) Appl. No.: 11/871,681

(22) Filed: Oct. 12, 2007

(51) Int. Cl.
*H04M 1/00* (2006.01)

(52) U.S. Cl. ........................ 455/558; 370/395.5; 705/14

(58) Field of Classification Search .................. 455/558, 455/445, 458, 466; 370/395.5; 463/26, 29, 463/13; 705/14
See application file for complete search history.

(56) References Cited

U.S. PATENT DOCUMENTS

| | | | |
|---|---|---|---|
| 4,649,384 A | 3/1987 | Sheafor et al. | |
| 5,040,237 A | 8/1991 | Barnes et al. | |
| 5,387,927 A | 2/1995 | Look et al. | |
| 5,544,303 A | 8/1996 | Maroteaux et al. | |
| 6,374,115 B1 | 4/2002 | Barnes et al. | |
| 6,529,486 B1 | 3/2003 | Barnes et al. | |
| 6,765,903 B1 | 7/2004 | Allen, Jr. et al. | |
| 7,031,754 B2 | 4/2006 | Scherzer et al. | |
| 7,076,329 B1 | 7/2006 | Kolls | |
| 7,095,734 B2 | 8/2006 | Allen, Jr. et al. | |
| 2002/0193104 A1 | 12/2002 | Scherzer et al. | |
| 2004/0212500 A1 | 10/2004 | Stilp | |
| 2004/0233909 A1 | 11/2004 | Allen et al. | |
| 2005/0043030 A1 | 2/2005 | Shariat et al. | |
| 2005/0208986 A1 | 9/2005 | Best et al. | |
| 2005/0210234 A1 | 9/2005 | Best et al. | |
| 2005/0210235 A1 | 9/2005 | Best et al. | |
| 2006/0178166 A1* | 8/2006 | Luu et al. | 455/558 |
| 2006/0194617 A1 | 8/2006 | Scherzer et al. | |
| 2006/0268845 A1 | 11/2006 | He et al. | |
| 2006/0270451 A1 | 11/2006 | Best et al. | |
| 2006/0271779 A1 | 11/2006 | Best et al. | |
| 2006/0274735 A1 | 12/2006 | Allen et al. | |
| 2008/0009318 A1* | 1/2008 | Evans | 455/558 |

* cited by examiner

*Primary Examiner* — Phuoc Doan

(57) ABSTRACT

Generally described, a method and system are provided for establishing a communication service. Upon detecting the insertion of a card into a wireless transceiver, a control system retrieves information from the card. The control system processes the information and selects communication service software for the card and communication service data for a communication network. The communication service software is transferred to the card and the communication service data is transferred to the communication network. The communication service software is installed on the card and one or more network elements in the communication network are provisioned.

25 Claims, 5 Drawing Sheets

METHOD AND SYSTEM FOR ESTABLISHING COMMUNICATION SERVICES

TECHNICAL FIELD

The invention is related to the field of communications, and in particular, to establishing a communication service in a communication network.

TECHNICAL BACKGROUND

Broadband wireless services such as High-Speed Packet Access (HSPA), Evolution-Data Optimized (EV-DO), and Worldwide Interoperability for Microwave Access (WiMAX) require modems and transceivers to provide wireless connectivity to the Internet or some other public or proprietary data network. As these technologies are introduced, manufacturers offering customer premise equipment (CPE) must keep up with the demand for new products utilizing the technology. Typically, manufacturers will offer basic equipment such as a modem or transceiver to establish connectivity. As the technology matures, additional features and services may become available to users of the technology. Unfortunately, this requires the purchase of additional equipment to take advantage of these features that may raise the barrier to entry for some consumers.

As service providers offer new services such as voice over packet (VoP) or voice over internet protocol (VoIP) that have the ability to leverage the user's existing broadband wireless CPE, the user is in many cases required to obtain additional equipment and software and register for the new services. Many times the consumer is unable to utilize the existing CPE and is required to purchase an entirely new broadband modem that offers the additional functionality. Further, the burden is on the user to ensure that the new hardware is configured properly and that services utilizing the new software and hardware are properly registered. This may require multiple registration and configuration steps to ensure that the new equipment can operate on the service provider's network and that the service provider's network has the ability to recognize the new equipment so that the user may enjoy the desired services.

TECHNICAL SUMMARY

Generally described, a method and system are provided for establishing a communication service. Upon detecting the insertion of a card into a wireless transceiver, a control system retrieves information from the card. The control system processes the information and selects communication service software for the card and communication service data for a communication network. The communication service software is transferred to the card and the communication service data is transferred to the communication network. The communication service software is installed on the card and one or more network elements in the communication network are provisioned.

In another aspect of the communication system, a system is provided for implementing a communication service. A card is provided for performing the communication service. The card is configured to be communicatively connected to a wireless transceiver. Further, a communication network is provided that comprises one or more network elements. A control system detects the receipt of the card into the wireless transceiver and provides the card with communication service software and the communication network with communication service data to provision the one or more network elements.

DETAILED DESCRIPTION

Figure 1:
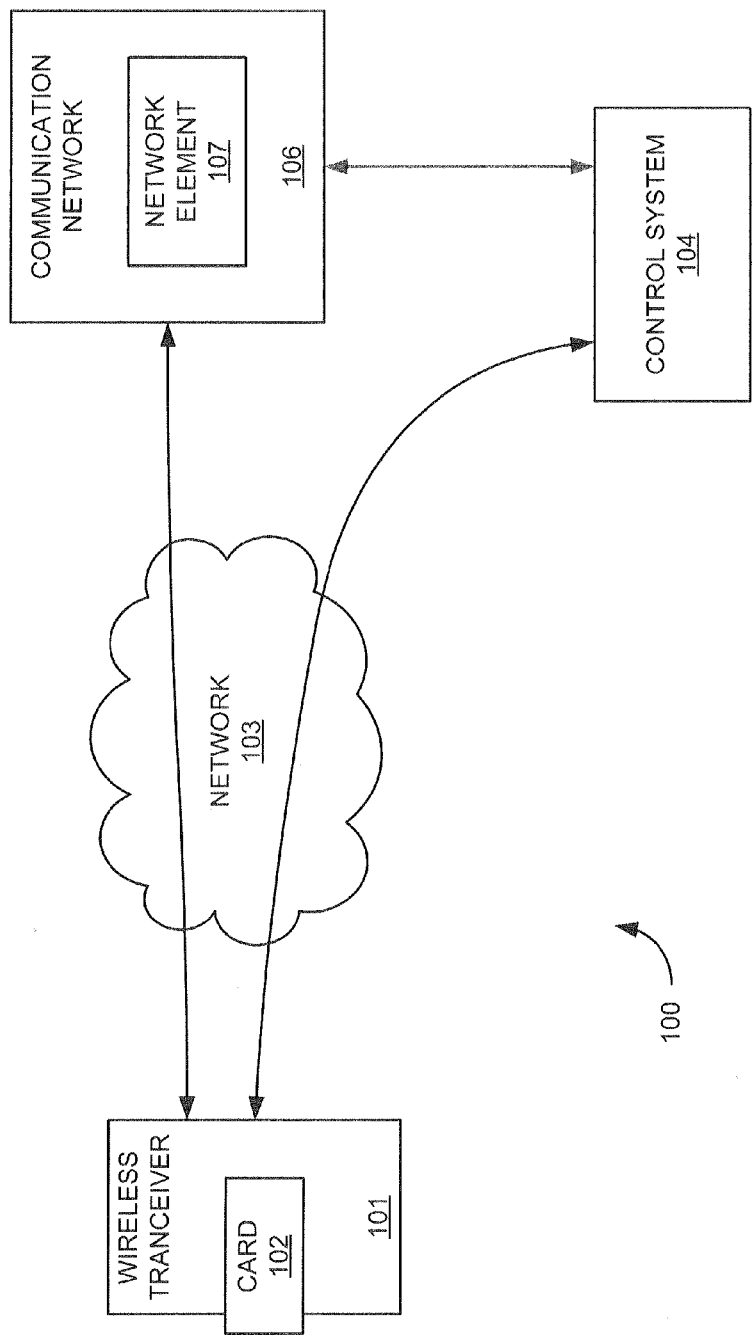
FIG. 1 is a block diagram illustrating a communication system for implementing a communication service.

Referring to FIG. 1, the operating environment of communication system 100 includes wireless transceiver 101, card 102, network 103, control system 104, communication network 106 and network element 107. Wireless transceiver 101 communicatively receives card 102 and exchanges information with control system 104 via network 103. Control system 104 exchanges information with communication network 106 and communication network 106 includes network element 107.

Wireless transceiver 101 comprises any unit that has wireless communication capabilities performing wireless receive and transmit functions. Wireless transceiver 101 may include broadband modems, routers, adapters and the like that provide a gateway function between a wireless network and a computing device such as a personal computer. Wireless transceiver 101 could transmit and receive utilizing any number of wireless technologies including, but not limited to, Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX) and the like. Further, wireless transceiver 101 may include the ability to transmit and receive over a single wireless protocol or multiple wireless protocols and have the ability to simultaneously utilize multiple protocols.

Card 102 comprises any unit that allows communication connectivity between a communication device and wireless transceiver 101. Examples of card 102 may include an analog telephony adapter or analog telephone adapter (ATA) that may be used in providing Voice over Packet (VoP) services. Other examples for card 102 could include a wireless local access node (LAN) transceiver, such as a Wireless Fidelity (Wi-Fi) transceiver, that enables wireless communication between a wireless device and wireless transceiver 101. In such an example, card 101 could provide any number of communication activities, including acting as a wireless hub for the wireless LAN or offering a peer-to-peer communications between card 102 and the wireless device.

Exchanging information between wireless transceiver 101 and card 102 may be accomplished through a variety of techniques. Communication connectivity may be established by using ports including Personal Computer Memory Card International Association (PCMCIA), Universal Serial Bus (USB) or any other communication port. Connectivity may also be established by utilizing any number of ultra wideband wireless technologies, piconets or personal area network wireless technologies including Bluetooth.

Network 103 comprises any type of telecommunications network that would allow wireless transceiver 101 to exchange information with control system 104 and communication network 106. Network 103 could be any packet-based network or packet switching system where packets are routed over data links shared with other traffic. Characteristics of packet-based networks include optimizing channel capacity available in a network, minimizing transmission latency and increasing robustness of communication. For example, network 103 could include many of the public switched data networks (PSDNs) such as the internet protocol network, Frame Relay, Asynchronous Transfer Mode (ATM), General Packet Radio Service (GPRS), Ethernet and others.

Control system 104 comprises any computer system that that has the ability to communicate and exchange information with wireless transceiver 101 over network 103 and communications network 106. Examples of control system 104 include servers, application servers, personal computers, computer workstations, laptop computers, and any other computing device. Control system 104 could also be comprised of a programmed general-purpose computer, although those skilled in the art will appreciate that programmable or special purpose circuitry and equipment may be used and such functionality may be distributed among multiple computing units.

Communication network 106 includes functions typically found in telecommunication networks including all the necessary signaling, transport and management functions that may be operated by a single entity or by multiple entities. To achieve these functions, communication network 106 includes one or more network elements 107.

Signaling functions include the establishment and control of a connection, routing and the management of the network to establish and maintain a communication link between two or more nodes and may comprise in-band signaling or out-of-band signaling. Examples of signaling protocols are Signaling System #7 (SS7), Session Initiated Protocol (SIP), H.323 and the like. Network elements 107 that perform signaling functions may include call processors, softswitches, media gateway controllers, service switching points (SSPs), signal transfer points (STPs) and service control points (SCPs).

Transport functions may be achieved through packet networks as described above and though circuit networks using Time-Division Multiplexing (TDM) and the like. Network elements 107 that perform transport functions comprise call processors, softswitches, media gateways, routers and circuit switches.

Managing communication network 106 comprises billing, authenticating and other network management functions to facilitate tracking a user's activity on a telecommunications network. Examples of network management functions comprise controlling, planning, allocating, deploying, coordinating, and monitoring the resources of a network, including performing functions such as initial network planning, frequency allocation, predetermined traffic routing to support load balancing, cryptographic key distribution authorization, configuration management, fault management, security management, performance management, bandwidth management, and accounting management. Network elements 107 that perform management functions comprise authentication servers, provisioning servers, security servers, billing platforms and any other platform that enables a network provider to manage its network.

Figure 2:
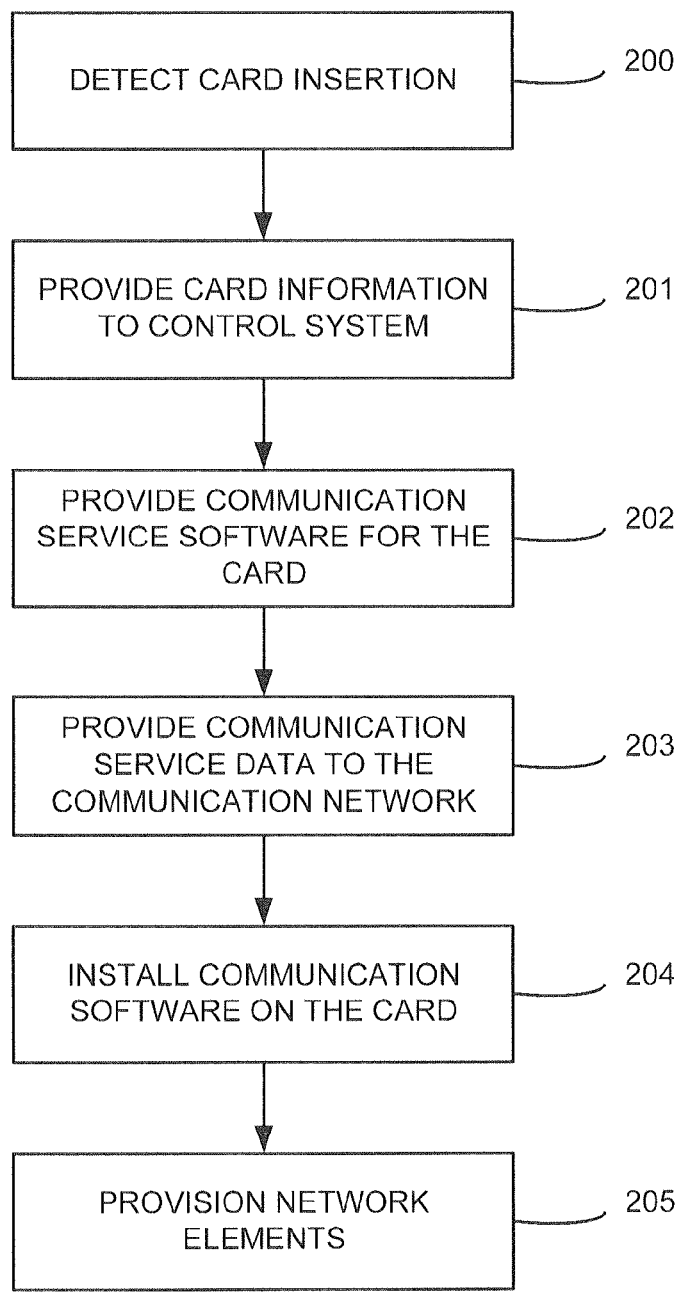
FIG. 2 is a flow diagram illustrating a method for implementing a communication service.

In operation, as illustrated in FIG. 2, communication system 100 detects that card 102 is inserted into wireless transceiver 101 by a user (200). Detecting the insertion of card 102 into wireless transceiver 101 may be accomplished in any number of ways and by any number of components within communication system 100. For example, control system 104 may monitor wireless transceiver 101 to determine if card 102 is inserted. Wireless transceiver 101 itself may report to control system 104 that card 102 is inserted. Detecting card insertion may be accomplished utilizing any number of communication protocols including, but not limited, the signaling or transport protocols discussed above.

Information is retrieved from card 102 and transferred to control system 104 (201). Information comprises any data that may be necessary for card 102 to be utilized in communication system 100 including, but not limited to, identification information for card 102 and wireless transceiver 101. Card 102 and wireless transceiver 101 may be identified by communication system 100 by their respective Media Access Control (MAC) addresses, Extended Unique Identifier (EUI) address, internet protocol (IP) addresses or any other unique identifier that may be assigned to a device or software.

Control system 104 receives the information and determines if communication service software and communication service data may be necessary to utilize card 102 in communication system 100. As described above, card 102 may be a device that enables Wi-Fi communication between wireless transceiver 101 and a Wi-Fi device. In such as case, card 102 may require software or firmware to communicate with wireless transceiver 101. Using the information provided to control system 104, control system 104 can determine if such software or firmware is necessary and then in turn provide the software to card 102 via network 103 and wireless transceiver 101 (202).

Control system also provides communication network 106 communication service data as necessary (203). Communication service data may include any information necessary that would enable card 102 to utilize the signaling, transport and management functions described above. Communication service data may be provided to communication network 106 utilizing any number of conventional data communication protocols that include, but are not limited to, internet protocol, SIP and other proprietary or non-proprietary protocols.

Upon obtaining the communication service software, the communication service software is installed on card 102 (204). Communication service data is also received by communications network 106 and network element 107 is provisioned to enable card 101 and wireless transceiver 102 to utilize communication system 100 (205).

Figure 3:
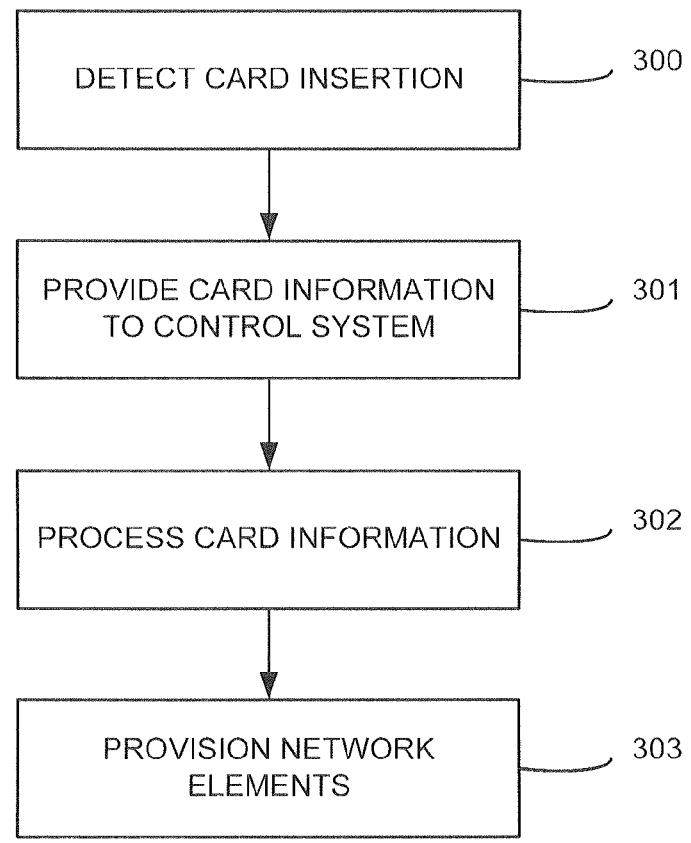
FIG. 3 is a flow diagram illustrating yet another method for implementing a communication service.

In another embodiment, referring to FIG. 3, communication system 100 detects that card 102 is inserted into wireless transceiver 101 by a user (300). Detecting the insertion of card 102 into wireless transceiver 101 may be accomplished in any number of ways and by any number of components within communication system 100 as described above. Information is retrieved from card 102 and is provided to control system 104 (301). As detailed previously, card information comprises identification information that uniquely identifies card 102.

Control system 104 processes the card information and determines the appropriate communication service data to provide to communication network 106 (302). Control system then provides the communication service data to communication network 106 and the its associated network element 107 are then provisioned utilizing the communication service data so that card 101 can operate on communication system 100 (303).

Figure 4:
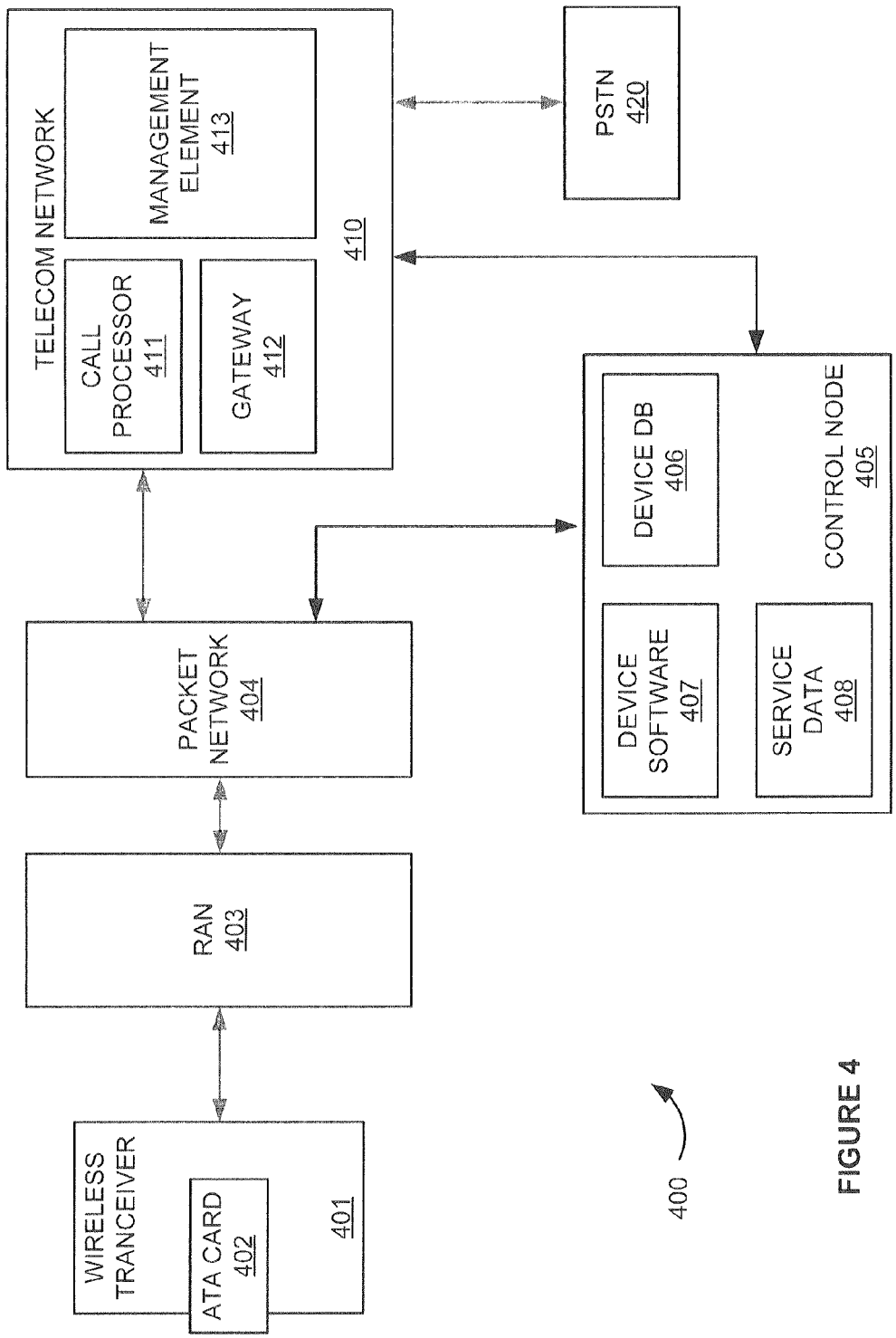
FIG. 4 is a block diagram illustrating a communication system for implementing a voice over packet communication service.

Referring now to FIG. 4, another embodiment is shown where communication system 400 comprises wireless transceiver 401, ATA card 402, radio access network (RAN) 403, packet network 404, control node 405, telecommunications (telecom) network 410 and public switched telephone network (PSTN) 420. Control node 405 comprises device database (DB) 406, device software 407 and service data 408. Telecom network 410 comprises call processor 411, gateway 412, and management element 413. Wireless transceiver 401 is configured to exchange information with card 402. Wireless transceiver 401 exchanges information with control node 405 and telecom network 410 via RAN 403 and packet network 404. Access to PSTN 420 is made by a link with telecom network 410.

Wireless transceiver 401 comprises a wireless modem that has the ability to provide broadband wireless connectivity to RAN 403. Wireless protocols that may be utilized in this embodiment comprise CDMA 1xRTT, GSM, HSPA, EV-DO, EV-DO rev. A, B, or C, 3GPP LTE, WiMAX and the like. Further, wireless transceiver 401 contains the necessary elements and circuitry to receive ATA card 402. Examples of such elements would include connector and power provisioning circuitry for ATA card 402. Connector elements may include ports such as PCMCIA, USB or any other communication port.

In this particular embodiment, card 402 comprises an ATA card with the ability to provide VoP or VoIP functionality utilizing wireless transceiver 401. An ATA provides the ability to connect one or more standard analog telephones to a digital or non-standard telephone system such as a VoIP network by encoding the voice signal into internet protocol packets. ATA card may include several physical interfaces such as a modular connector (RJ11, RJ14, RJ25, etc.) to enable connecting an analog phone. The ATA may also include external Ethernet ports and power supply ports to activate the ATA. Alternatively, as described above, ATA card 402 may receive its power from wireless transceiver 401.

Packet network 404 could be any packet-based network or packet switching system where packets are routed over data links shared with other traffic. Characteristics of packet-based networks include optimizing channel capacity available in a network, minimizing transmission latency and increasing robustness of communication. For example, packet network 404 could include many of the public switched data networks (PSDNs) such as the internet protocol network (Internet), Frame Relay, Asynchronous Transfer Mode (ATM), General Packet Radio Service (GPRS), Ethernet and others. Packet network 404 could also include any number of private data networks that would utilize similar protocols.

PSTN 420 may be any circuit-based network that provides dedicated circuits to enable communication between mobile devices. Circuit-switching networks may be characterized as communication networks that establish dedicated circuits or channels between nodes and terminals to enable users to communication with one another.

Packet network 404 is accessed by wireless transceiver 401 utilizing RAN 403. RAN 403 may be a single wireless network that utilizes conventional wireless communication protocols. Alternatively, RAN 403 may include multiple wireless networks utilizing different wireless protocols. Wireless protocols include, but are not limited to, CDMA 1xRTT, GSM, HSPA, EV-DO, EV-DO rev. A, B, or C, 3GPP LTE, WiMAX and the like.

Control node 405 comprises any computing platform that allows the functionality as described herein. For illustrative purposes, control node 405 is shown as a separate platform residing external to telecom network 410. But control node 405's functions may be integrated into telecom network 410 and distributed among several network elements within telecom network 410.

Device DB 406 maintains records of devices that have the ability to utilize communication system 400. The records include characteristics and capabilities for the devices. Device DB 406 stores device information based upon the device's unique identifier such as its MAC or EUI address. Device DB 406 may be a single database or it may include multiple databases residing on different servers in control node 405 or telecom network 410.

Device software 407 comprises any software that may be required by a device operating on communication system 400. Device software 407 would include software or firmware necessary for wireless transceiver 401 and ATA card 402 to operate and have access to telecom network 410 and its various functions. For example, device software 407 may include scripts and code that would be provided to ATA card 402 that would enable a user to activate voice services utilizing telecom network 410. Additionally, device software 407 may include programming and network information that allows wireless transceiver 401 to provision ATA card 402 with the necessary VoP or VoIP functionality to make voice calls utilizing telecom network 410. Network information that may be provided to ATA card 402 includes the packet or internet protocol address of call processor 411, the phone number associated with ATA card 402 and the internet protocol address and codec information.

Service data 408 comprises the information needed by telecom network 410 to recognize and allow wireless transceiver 401 and ATA card 402 to operate on telecom network 410. Service data 408 comprises information about wireless transceiver 401 and ATA card 402 for call processor 411, gateway 412 and management element 413 to perform their intended functions described herein. For example, service data 408 may include the unique identification information for ATA card 402 and wireless transceiver 401 that would be provided to call processor 411. Service data 408 would also include information about a user associated with wireless transceiver 401 and ATA card 402 that would be provided to management element 413 to authenticate and track billing and accounting functions.

Telecom network 410 includes any elements and functionality that provide data and VoP communication services that could be utilized by wireless transceiver 401 and ATA card 402.

As part of telecom network 410, call processor 411 comprises any device or platform that performs call routing functionality and other call-related features in a packet network environment. Examples of call processor 411 include, but are not limited to, softswitches and call agents and may also include media gateway controllers depending on the architecture. Call routing functionality may include routing packet-to-packet calls in packet network. Other call-related features that may be performed by call processor 411 include call forwarding, call waiting and other calling services offered to telephone subscribers.

Gateway 412 comprises any device that allows voice calls to be exchanged between a packet network and a circuit-switched network. Gateway 412 may be comprised of many elements including media gateways, session border controllers (SBCs), breakout gateways and PSTN gateways. These components and functions may reside on one device or may be distributed among many platforms on telecom network 410.

Management element 413 comprises billing, authenticating and other network management functions to facilitate tracking a user's activity and offering applications to users on a telecommunications network. Examples of management element 413 may include authentication, authorization and accounting (AAA) servers, home agents, foreign agents, home subscriber servers, home location register platforms and the like. Management element 413 that may perform management functions comprise authentication servers, provisioning servers, security servers, billing platforms and any other platform that enables a network provider to manage its network. These elements and functionality may be performed on one platform or distributed among many platforms or servers.

Figure 5:
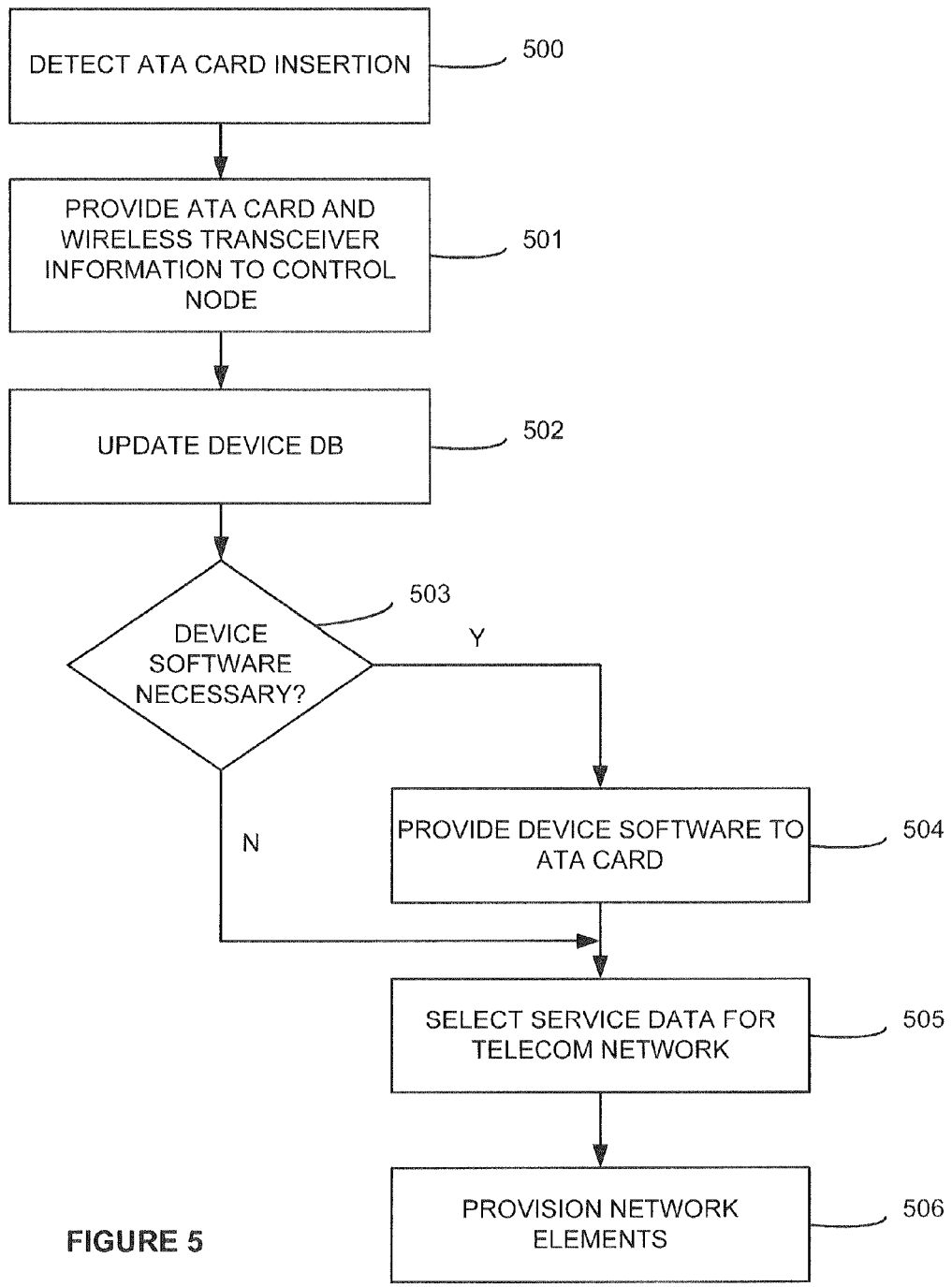
FIG. 5 is a flow diagram illustrating a method for implementing a voice over packet communication service.

Referring to FIG. 5, a method for establishing a voice over packet service is described. The insertion of ATA card 401 into wireless transceiver 402 is detected by communication system 400 (500). Detection by communication system 400 may be done by control node 405 or any other network element described herein.

Information about ATA card 402 is retrieved and it along with information about wireless transceiver 401 is transferred to control node 405 utilizing RAN 403 and packet network 404 (501). Control node 405 processes the information and determines the status of ATA card 402 and wireless transceiver 401 utilizing device DB 406. Using wireless transceiver's 401 MAC address or other unique identification information, control node 405 polls device DB 406 to authenticate wireless transceiver 401 and determines wireless transceiver's 401 capabilities. If this is the first time ATA card is inserted into wireless transceiver 401, control node 405 updates device DB 406 to include the ATA card capability and associates wireless transceiver 401 with ATA card 402 (502).

Control node 405 determines if device software 407 is needed for ATA card 402 to operate on telecom network 410 by looking at the characteristics of ATA card 402 stored in device DB 406 (503). If device software 407 is required, control node 405 transfers such software to ATA card 402 utilizing packet network 404, RAN 403 and wireless transceiver 401 and is installed on ATA card 402 (504).

Control node 405 also selects service data 408 that may be required by telecom network 410 so that ATA card 402 can operate on telecom network 410 (505). Service data 408 is transferred to telecom network 410 and call processor 411, gateway 412 and management element 413 are provisioned as necessary so that ATA card may begin using voice services on telecom network 410 (506). When provisioning call processor 411, gateway 412 and management element 413, the service data includes the MAC address and user identification information (i.e. a user name and password) as described above to properly authenticate and bill a user operating on telecom network 410.

When providing device software 407 to ATA card 402, control node 405 may also provide a link, form or code that would prompt a user to establish voice communication services utilizing telecom network 410. Examples of service offerings may include a user selecting or entering a phone number (i.e. E.164 number), the type of communication service such as international, local or other type of calling plan, the number of minutes for a calling plan or the physical address of the user for emergency services (i.e. E-911). Prompting a user to establish voice services may take place at the initial detection of the ATA card 402 being inserted into wireless transceiver 401 or may occur at any time later after ATA card is registered for use on telecom network 410.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of implementing a communication service, the method comprising:
   detecting insertion of a card into a wireless transceiver;
   in response to the insertion of the card, retrieving information from the card and transferring the information to a control system;
   processing the information in the control system to select communication service software for the card and to select communication service data for a communication network;
   transferring the communication service software to the card in response to processing the information;
   transferring the communication service data to the communication network in response to processing the information;
   installing the communication service software on the card; and
   provisioning one or more network elements in the communication network using the communication service data to establish the communication service.

2. The method of claim 1 wherein the communication service comprises a voice over packet service.

3. The method of claim 1 wherein the communication service software directs the card to encode user voice information into internet protocol packets for transfer to the communication network.

4. The method of claim 1 wherein the transferring of the information to the control system comprises transferring the information over a wireless link.

5. The method of claim 1 wherein the transferring the communication service software to the card comprises transferring the communication software over a wireless link.

6. The method of claim 1 wherein the communication service data directs the one or more network elements to decode user voice information from internet protocol packets.

7. The method of claim 1 wherein the one or more network elements comprise a voice over internet protocol call processor.

8. The method of claim 1 wherein the one or more network elements comprise a voice over internet protocol gateway.

9. The method of claim 1 wherein the one or more network elements comprise a management element.

10. The method of claim 1 wherein the wireless transceiver comprises a WiMAX modem.

11. The method of claim 1 wherein the communication service software directs the card to offer the communication service to a user.

12. The method of claim 1 wherein the communication service software directs the card to identify an E.164 number for a user.

13. The method of claim 1 further comprising transferring from the control system a communication service request form to a user.

14. A method of implementing a communication service, the method comprising:
   detecting insertion of a card into a wireless transceiver, wherein the card is configured to carry communications between the wireless transceiver and a communication device;

retrieving information from the card and transferring the information to a control system in response to the insertion of the card;
processing the information in the control system to select communication service software for the card and to select communication service data for a communication network;
transferring the communication service software to the card in response to processing the information;
transferring the communication service data to the communication network in response to processing the information;
installing the communication service software on the card;
provisioning one or more network elements in the communication network using the communication service data to establish the communication service.

15. The method of claim 14 wherein the communication service comprises a voice over packet service.

16. A communication system for implementing a communication service, the system comprising:
a card wherein the card performs the communication service;
a wireless transceiver for receiving the card configured to detect insertion of the card into the wireless transceiver, retrieve information form the card, and transfer the information to a control system;
a communication network wherein the communication network comprises one or more network elements;
the control system configured to process the information to select communication service software for the card, select communication service data for the communication network, transfer the communication service software to the card, and transfer the communication service data to the communication network;
the card further configured to install the communication service software on the card; and
the communication network configured to provision the one or more network elements using the communication service data to establish the communication service.

17. The system of claim 16 wherein the communication service is a voice over packet telecommunication service.

18. The system of claim 16 wherein the card comprises an analog telephone adapter (ATA) card.

19. The system of claim 16 wherein the card comprises a WiFi card.

20. The system of claim 16 wherein the wireless transceiver comprises a WiMAX modem.

21. The system of claim 16 wherein the wireless transceiver provides power to the card.

22. The system of claim 16 wherein the communication service software comprises a communication service request form to register for the communication services.

23. The system of claim 16 wherein the one or more network elements comprise a voice over internet protocol call processor.

24. The system of claim 16 wherein the one or more network elements comprise a voice over internet protocol gateway.

25. The system of claim 16 wherein the one or more network elements comprise a management element.

* * * * *